July 24, 1923.
G. G. F. BOSWELL
1,462,738
REBOUND CHECK SHOCK ABSORBER
Filed April 17, 1922
2 Sheets-Sheet 1
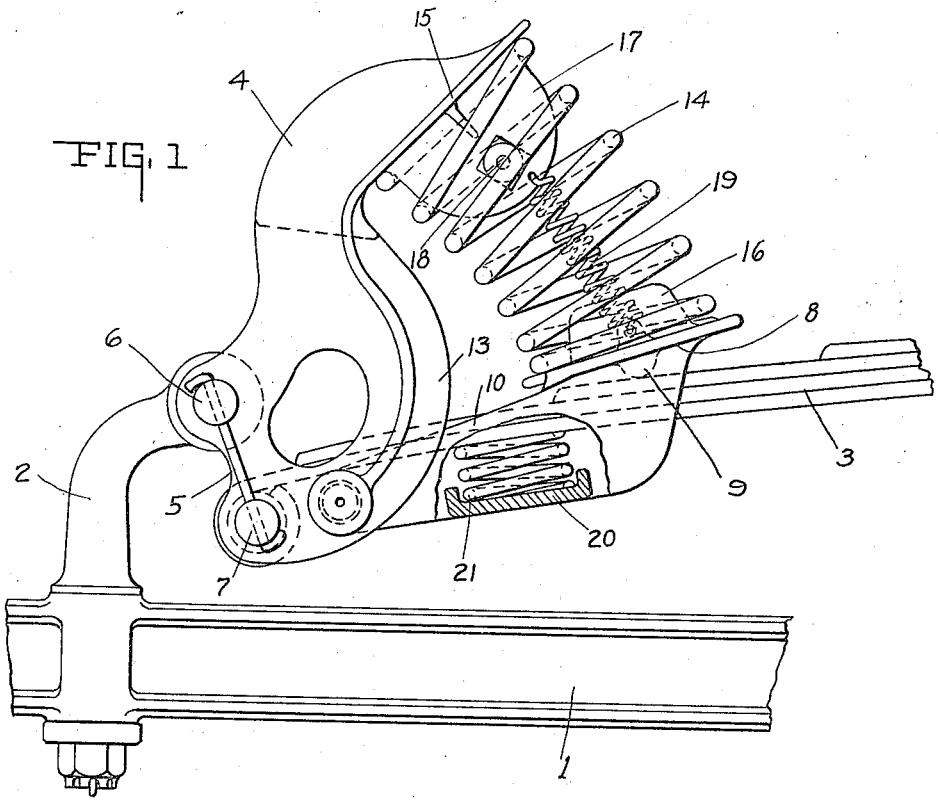
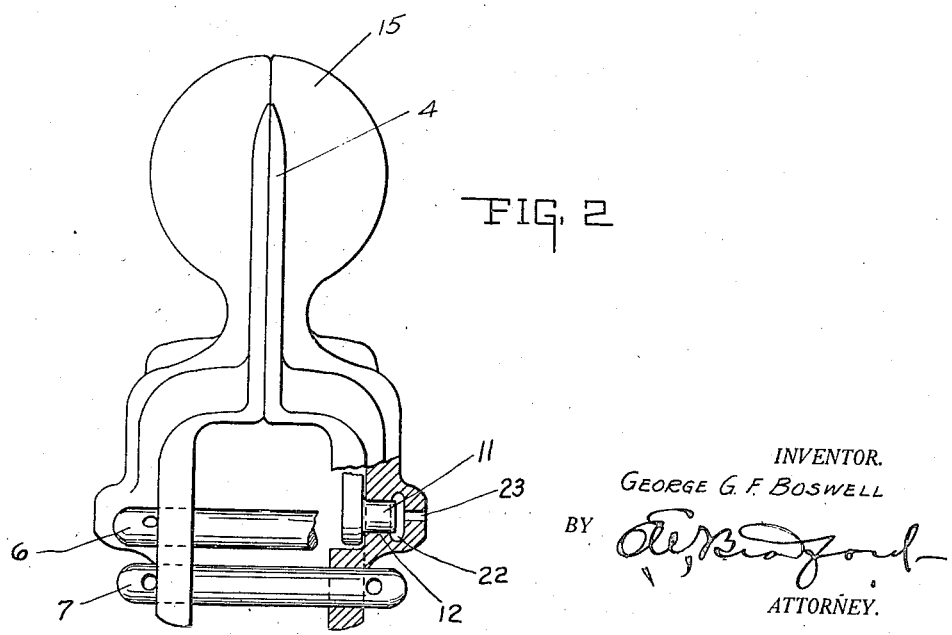
INVENTOR.
GEORGE G. F. BOSWELL
BY
ATTORNEY.

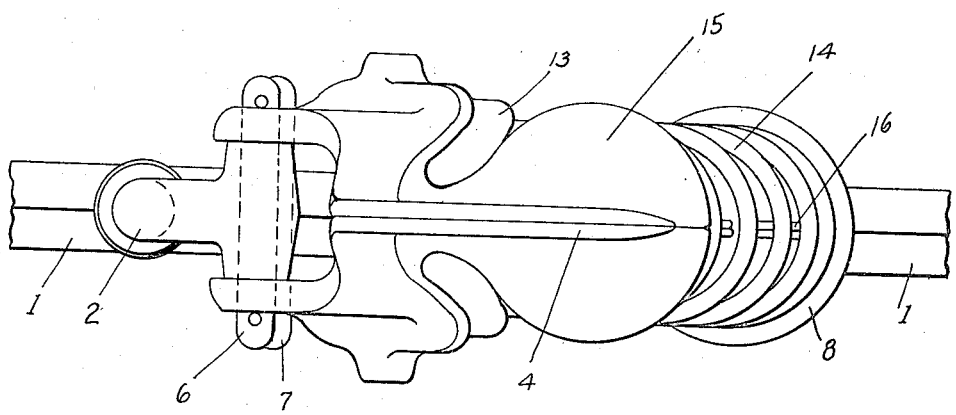
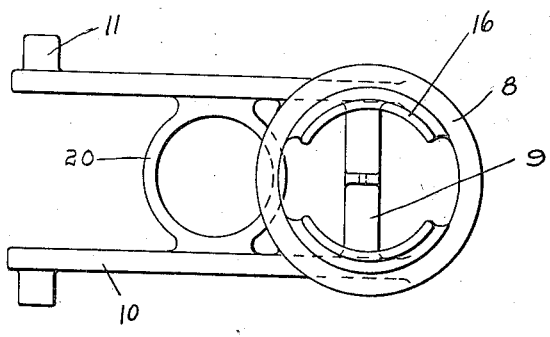

Patented July 24, 1923.

1,462,738

UNITED STATES PATENT OFFICE.

GEORGE G. F. BOSWELL, OF INDIANAPOLIS, INDIANA.

REBOUND-CHECK SHOCK ABSORBER.

Application filed April 17, 1922. Serial No. 553,662.

*To all whom it may concern:*

Be it known that I, GEORGE G. F. BOSWELL, a citizen of the United States, residing at Indianapolis, in the county of Marion and State of Indiana, have invented certain new and useful Improvements in Rebound-Check Shock Absorbers, of which the following is a specification.

This invention relates to rebound check shock absorbers, and is designed primarily for use in connection with Ford cars, and one of the features of the invention is the combined spring operating arm and base so constructed that on the compression of the spring the position of the base will be changed to bring the arc of movement of the end of the arm in axial alignment with the base, thereby maintaining the coils of the spring in uniform alignment and preventing buckling thereof.

A further feature of the invention is in so constructing the arm that it will form a shackle for suspending the body spring of the vehicle from the perch hanger.

A further feature of the invention is the provision of means for pivotally connecting the base member with parts of the swinging arm so as to cause said base member to travel with the longitudinal movement of the body spring.

A further feature of the invention is the provision of a rebound check for minimizing shock incident to a rebound of the body spring.

A further feature of the invention is in so constructing the arm portion of the device that the parts of the shock absorber may be very easily and quickly assembled.

A further feature of the invention is in so constructing the swinging arm at its point of pivotal connection with the base that an oil chamber will be provided.

A further feature of the invention is the provision of means for maintaining the parts of the shock absorber in assembled relation while being attached to the body spring and perch hanger.

Other objects and advantages will be hereinafter more fully set forth and pointed out in the accompanying specification.

In the accompanying drawings,

Figure 1 is a side elevation of one of the shock absorber structures applied to use, Figure 2 is a rear elevation thereof, partly in section, Figure 3 is a top plan view of the shock absorber, and Figure 4 is a plan view of the base member of the shock absorber removed from the arm portion thereof.

Referring to the drawings in which similar reference numerals designate corresponding parts throughout the several views, 1 indicates an axle, 2 a perch hanger connected therewith, and 3 a body spring, these elements being of the conventional Ford type.

It has been customary to suspend the ends of the body spring from the perch hanger by means of shackle plates, but in order to incorporate a shock absorbing spring and a rebound check in connection with the body spring and perch hanger, the ordinary form of shackle plates are dispensed with and a spring compressing arm 4 substituted therefor, said arm being preferably formed in two sections or halves, and one end of each half so constructed as to pass on opposite sides of the perch hanger, said separated ends being continued downwardly to form shackles 5 which are rigid with the parts of the arm. The arm is connected to the perch hanger 2 by extending a pin 6 through eyelets formed in the arm, and the end of the perch hanger, while the end of the body spring 3 is pivotally connected to the lower ends of the shackles 5 by introducing a pin 7 through eyelets in the ends of the shackles and through the usual form of eye at the end of the body spring.

Associated with the spring compressing arm 4 is a base 8 which rests over the body spring 3 and is provided with a rocking bar 9 which contacts with the body spring and is so constructed as to permit rocking movement of the base. Associated with the base are paralleling extensions 10 which pass on opposite sides of the body spring 3 and have at their free ends, outwardly extending studs 11 which co-operate with sockets 12 formed on forwardly extending sections 13 of the arm 4, said studs and sockets forming pivotal connection between the base and compressing arm 4 and are positioned forwardly of the pivotal connection between the shackles and body spring so that when the arm 4 is moving downwardly, rocking action will be imparted to the base 8, consequently the shock absorbing spring 14, which is introduced between the head 15 on the free end of the arm 4, and a head 16 on the base 8, will be held against buckling action owing to the fact that the axis of the base 8 will be brought into substantially true alignment with the axis of the head 15.

Any suitable means may be provided for securing the two halves of the compression arm 4 together, but in the present instance companion ears 17 are extended downwardly from the head 15 and through said ears are extended a bolt or rivet 18 and by forming said ears substantially semi-circular they will serve to retain the upper end of the shock absorbing spring 14 in engagement with the head 15.

In order to prevent the base 8 and head-end of the compressing arm 4 separating to such an extent as to release the shock absorber spring 14, at such time as the shock absorber is being attached to the perch hanger and body spring, a tension spring 19 is extended centrally through the shock absorbing spring 14 and has its ends connected respectively with the rocking bar 9 and the ears 17, the tension of said spring 19 being sufficient to prevent undue separation of the compressing arm and base, due to the tension of the shock absorbing spring 14 thereagainst.

In order to guard against shock, incident to undue rebound of the body spring, a pocket 20 is formed between the extensions 10 and in position to pass below the body spring 3, and in said pocket is positioned a rebound spring or check 21, the pocket 20 being positioned at a point between the base 8 and the pivot ends of the extension 10, consequently any undue upward movement of the body spring 3, as in the event of a rebound, will exert pressure on the spring 21, the tension of which will practically eliminate any shock before it is imparted to the body of the vehicle and the tension of the rebound spring 21 will also serve to normally hold the rocking bar 9 in engagement with the body spring 3.

As best shown in Figure 2 of the drawings, the sockets 12 into which the studs 11 project, are each provided with an interior chamber 22 which forms a receptacle for a lubricant so that the studs 11 will be properly lubricated at all times, the wall of the socket 12 having an opening 23 through which the lubricant is introduced into the chamber.

By forming the shackle portions 5 integral with the arm 4 and off-setting the bearing points of the base 8 from that of the body spring 3, the removal of the shock absorbing spring 14, or the breakage of the upper end of the compression arm 4 or base 8, will in no wise affect the suspension of the body spring 3 as it will remain suspended in the same manner as when the usual form of shackle plates are used. Also by off-setting the bearing point formed by the studs 11 and sockets 12 from that of the bearing point for the end of the body spring 3, the downwardly swinging movement of the free end of the arm 4 will carry the pivoted ends of the extensions 10 downwardly and cause the base 8 to rock on the body spring 3, such rocking movement maintaining axial alignment of the base with the axis of the moving end of the arm 4, consequently the coils of the shock absorbing spring 14 will be maintained normal, thereby obviating any possibility of the spring buckling, and through such buckling snap from between the end of the arm and the base.

Furthermore, by forming the arm 4 in halves, it may be very easily and quickly assembled with the base 8, as it is but necessary to enter the sockets in the halves of the arm over the studs 11 and then introduce the bolt 18 through the ears 17 for securely locking these parts together. After the arm and base have been secured together, the shock absorbing spring 14 is positioned between the base 8 and head 15 and the tension spring 19 then entered into the shock absorber spring and secured at its ends to the rocking bar and ears, the tension of this spring being sufficient to hold the base 8 and free end of the compression arm 4 in normal spaced relation. The end of the body spring is then passed below the base 8 and over the pocket 20 and these parts then brought to proper position for the introduction of the pins 6 and 7 which will securely lock the body spring and shock absorber in connection with the perch hanger. If desired the tension spring 19 may then be removed.

Having thus fully described my said invention, what I claim as new and desire to secure by Letters Patent, is:

1. In a rebound check shock absorber, a combined compressing arm and shackle, means for pivotally connecting said arm and shackle to a perch hanger and body spring of an automobile, a base member, means for pivotally securing the base member to parts of the compressing arm, a shock absorber spring between said compressing arm and base, and a rebound spring carried by parts of said base and positioned below the body spring.

2. In a rebound check shock absorber, the combination with the perch hanger and body spring of a vehicle, of a combined compressing arm and shackle plates, means for pivotally connecting the arm and shackle plates to said perch hanger and body spring, a base member, extensions on the base member, means for pivotally connecting said extensions to parts of said compressing arm, a pocket extending below the body spring and connected to said extensions, and a rebound spring seated in said pocket and engaging the under face of the body spring.

3. In a rebound check shock absorber, the combination with the perch hanger and body spring of a vehicle, of a two-part compressing arm, means for securing the parts of the arm together, shackles integral with the sections of said arm, means for pivotally connecting the shackles and arm to said perch hanger and body spring, a base member above said body spring, extensions on said base member, means for pivotally connecting said extensions to parts of said arm at a point in advance of the pivotal connection between said shackles and the body spring, a shock absorber spring between said compressing arm and said base, and a rebound spring carried by said extensions and adapted to engage the under face of the body spring.

4. In a rebound check shock absorber, the combination with a perch hanger and a body spring of a vehicle, of a compressing arm having one of its ends bifurcated, shackles integral with the bifurcated portion of the arm, means for pivotally connecting the arm and shackle plates to the perch hanger and body spring respectively, sockets formed in the bifurcated portions of the arm, a base member, extensions on said base member, studs on the extensions adapted to enter said sockets and form a pivot, and a shock absorber spring between said base and one end of said compressing arm.

5. In a rebound check shock absorber, a compressing arm having one of its ends bifurcated, a pair of sockets in the bifurcated portion diametrically opposite each other, lubricant receiving chambers formed in said sockets, a base member, a pair of arms connected to said base member, studs on said arms adapted to enter said sockets and pivotally connecting the base with the compressing arm, and a shock absorber spring between said base and one end of said arm.

6. In a rebound check shock absorber, the combination with a perch hanger and the body spring of a vehicle, of a compressing arm, means for pivotally connecting said arm to said perch hanger, means for supporting the body spring from said arm, sockets formed in said arm, a base member, extensions on said base member, studs on said extensions adapted to enter said sockets and pivotally connect the base member with said arm, a shock absorber spring between the base member and the free end of said arm, and a rebound spring carried by said extensions adapted to direct pressure against the under face of said body spring.

In witness whereof, I have hereunto set my hand and seal at Indianapolis, Indiana, this 8th day of November, A. D. nineteen hundred and twenty-one.

GEORGE G. F. BOSWELL. [L. S.]

Witnesses:
   CAREY S. FRYE,
   M. L. SHULER.